United States Patent [19]
Rohlfs et al.

[11] 3,839,276
[45] Oct. 1, 1974

[54] FLAMEPROOFING THERMOPLASTIC POLYMERS BY INCORPORATING THE REACTION PRODUCT OF EITHER UREA OR THIOUREA AND PHOSPHORUS PENTOXIDE

[75] Inventors: Hans-Adolf Rohlfs, Heidelberg; Adolf Nebelung, Mannheim, both of Germany

[73] Assignee: Benckiser-Knapsack GmbH, Ladenburg/Neckar, Germany

[22] Filed: Oct. 3, 1972

[21] Appl. No.: 294,548

[30] Foreign Application Priority Data
Oct. 9, 1971  Germany.............................. 2150483

[52] U.S. Cl............. 260/45.9 NP, 252/8.1, 423/305
[51] Int. Cl............................................. C08g 51/60
[58] Field of Search............................ 260/45.9 NP

[56]  References Cited
UNITED STATES PATENTS

| | | | |
|---|---|---|---|
| 2,600,455 | 6/1952 | Wilson et al......................... | 117/137 |
| 3,134,742 | 5/1964 | Wismer et al. .............. | 260/45.9 NP |
| 3,423,343 | 1/1969 | Barnett............................ | 260/2.5 AJ |

FOREIGN PATENTS OR APPLICATIONS

| | | | |
|---|---|---|---|
| 294,322 | 1/1965 | Australia ..................... | 260/45.9 NP |

*Primary Examiner*—Donald E. Czaja
*Assistant Examiner*—Gary R. Marshall
*Attorney, Agent, or Firm*—Erich M. H. Radde

[57]  ABSTRACT

Substantially water-insoluble polyanionic compounds are obtained by heating urea or thiourea with phosphorus pentoxide until ammonia evolution ceases. The reaction products are useful flameproofing agents for thermoplastics.

8 Claims, No Drawings

FLAMEPROOFING THERMOPLASTIC POLYMERS BY INCORPORATING THE REACTION PRODUCT OF EITHER UREA OR THIOUREA AND PHOSPHORUS PENTOXIDE

BACKGROUND OF THE INVENTION

1. Field of the Invention

The present invention relates to polyanionic compounds and more particularly to substantially water-insoluble polyanionic compounds containing nitrogen and phosphorus, to a process of producing such polyanionic compounds, to flameproofing compositions containing same, and to a method of flameproofing articles and especially thermoplasts.

2. Description of the Prior Art

It is known to react ammonia with polyphosphoric acids, urea with polyphosphoric acids, urea with orthophosphoric acid, urea with ammonium phosphates, and urea with phosphorus pentoxide and ammonia at a temperature between 200° C. and 250° C. All these reactions result in the production of soluble or insoluble ammonium polyphosphates.

When heating urea with phosphorus pentoxide at 80°–85° C., urea phosphate condensate products are obtained as described in "Chemical Abstracts" Vol. 67 (1967), page 4,986, Abstract No. 53 286n. Such reaction products are water-soluble urea phosphates the structure of which is analog to that of the alkali metal orthophosphates and polyphosphates and in which the alkali metal moiety is replaced by urea. Well defined water-soluble ortho- and pyrophosphates of urea which are obtained by dissolving urea in water and adding phosphorus pentoxide in the desired stoichiometric proportions thereto at a temperature of 50°–60° C., are described in "Chemical Abstracts" Vol. 70 (1970), Abstract No. 60 839 k.

Furthermore, various nitrogen-containing phosphorus compounds are obtained by reacting ammonia with phosphorus pentoxide. In this reaction part of the phosphorus pentoxide is suspended in an organic solvent and the reaction product is heated, if required, at a temperature between about 100° C. and about 200° C.

In all these reactions, water-soluble compounds are obtained or compounds which are soluble in conventionally used solvents. These compounds, however, are thermally unstable, i.e., they are readily decomposed, when heated, whereby ammonia is split off. Thus, for instance, reaction products of phosphorus pentoxide and anhydrous ammonia are described in U.S. Pat. No. 3,102,821. According to said patent the reactants are heated to a temperature of 150° C. When proceeding in this manner, water-soluble reaction products are obtained. Although these reaction products have flame-inhibiting properties, they do not stand up when exposed to the high temperatures required, for instance, when incorporating such compounds into thermoplastics. Thus they can be employed as flame-inhibiting agents only if their application is not accompanied by exposure to a high temperature. This is, for instance, the case when admixing such products to paints and dyes and when applying them to articles by impregnation by means of their solutions.

French Pat. No. 1,145,836 discloses the manufacture of resins used for lacquers, the temperature resistance of which is achieved or improved by condensing the resin molecule with phosphorus amides.

French Pat. No. 1,327,120 describes the reaction of chainlike phosphorus nitrile chlorides with ammonia containing methanol. Thereby, the methyl esters of the phosphorus nitrile compounds are obtained. In this case, ammonia is only required in order to bind, and combine with the hydrochloric acid which is formed on esterification. Otherwise, said hydrochloric acid would immediately split up the resulting esters. The final products obtained thereby are water-soluble and serve to render flame resistant cellulose-containing materials.

All the products mentioned hereinabove are not suitable as flameproofing agents for flameproofing thermoplastics because they are decomposed during their incorporation into the thermoplastic at temperatures of about 280° C. and even higher, which are required for such incorporation. Furthermore, the decomposition temperature of these compounds is considerably reduced by said thermoplastics so that a reaction with the polymers takes place. This reaction in turn results in depolymerization and foaming of the plastic material. Thereby, the flame-inhibiting properties as well as the characteristic properties of the thermoplastics are lost and undesired discoloration takes place.

SUMMARY OF THE INVENTION

It is one object of the present invention to provide stable polyanionic compounds which are substantially completely insoluble in water and all conventional solvents, which have an extremely high thermal stability, which are especially useful flameproofing additives to be added and incorporated into thermoplastics.

Another object of the present invention is to provide a simple and effective process of producing such polyanionic compounds.

A further object of the present invention is to improve the flame resistance of thermoplastics and to flameproof thermoplastic compositions and articles made therefrom.

Still another object of the present invention is to provide thermoplastic articles which are flameproof and exhibit a high stability on burning.

Other objects of the present invention and advantageous features thereof will become apparent as the description proceeds.

In principle the polyanionic compounds according to the present invention which are substantially insoluble in water and in conventionally used solvents are obtained by reacting urea or thiourea and phosphorus pentoxide in a molar proportion of 1.5:1.0 to 6.0:1.0 at a temperature between about 250° C. and about 400° C. until evolution of ammonia ceases. Thereby, polyanionic compounds of pentavalent phosphorus with a phosphorus pentoxide content between about 40 percent and about 80 percent, a total nitrogen content between about 10 percent and about 30 percent, and an ammonia nitrogen content between about 7 percent and about 20 percent are obtained. Preferably urea and phosphorus pentoxide are reacted with each other in a molar proportion of 3.0:1.0 to 4.0:1.0. Thereby, reaction products with a molar proportion of nitrogen to phosphorus corresponding to 1.5:1.0 to 5.0:1.0 and preferably corresponding to 1.8:1.0 to 3.5:1.0 are obtained.

The resulting compounds are characterized by their extraordinary thermal stability. Thus they can advantageously be used as flameproofing agents which can be employed and incorporated into thermoplastics.

A further advantage of these compounds is to be seen in their property that they are colorless and thus do not affect or change the color of the thermoplastic material to be flameproofed. This is in contrast to the addition of red phosphorus which has previously been used for this purpose and which causes discoloration.

In contrast to the heretofore mainly employed halogen-containing, flameproofing additives, the products obtained according to the present invention have the advantage that the so-called secondary harmful effects are not observed. Such secondary detrimental effects are caused by the formation of the corresponding hydrogen halides which are formed when burning thermoplastics.

Since the compounds according to the present invention are substantially insoluble in all conventional solvents, it has not yet been possible to elucidate and determine their structure by means of the nuclear resonance spectrum. Infrared spectra which were carried out by means of potassium bromide briquets indicate that part of the nitrogen is present therein as ammonium ion. In addition thereto, part of the nitrogen is also present as nitrogen bound in the form of amide and imide groups. This result is in agreement with the nitrogen analysis carried out according to the Kjeldahl method. Thereby, nitrogen values which considerably deviate from each other depending upon whether they have been carried out with selenium addition or without selenium addition, are found. It can be assumed that compounds with a chain-like structure, similar to that of polyphosphates, are involved. In contrast to the polyphosphates they are of a very large chain length. Thereby, P-O-P groups are statistically replaced by P-NH-P-groups and probably part of the $NH_4O$-groups are replaced by $NH_2$-groups.

The flameproofing properties of the compounds according to the present invention can be furthermore improved by mechanically admixing thereto oxides and/or sulfides of metals of the second, third, and fourth main and transition groups as well as of the fifth and sixth transition groups of the Periodic System. Amounts of 0.5 percent to 5 percent and preferably of 1.0 percent to 3.0 percent of such metal oxides or sulfides are added. Especially suitable for the present purpose are tungsten oxide, tin oxide, titanium dioxide, zirconium oxide, calcium sulfide.

DESCRIPTION OF THE PREFERRED EMBODIMENTS

The following examples serve to illustrate the present invention and the preparation of the novel compounds without, however, limiting the same thereto.

EXAMPLE 1

Urea and phosphorus pentoxide are intimately mixed in a molar proportion of 4.0:1.0. The mixture is heated in a preheated furnace to 340°C. for 2 hours. The reaction mixture expands and swells up considerably during the reaction, thereby evolving gas. The resulting cake which is slightly plastic at the reaction temperature, hardens and solidifies on cooling. It is coarsely crushed and is then finely pulverized. A product is obtained which is insoluble in water and all conventional solvents. Thus elucidation of its structure is not possible.

Analysis after decomposition:
54.3 % of phosphorus pentoxide,
26.45% of total nitrogen.
Molar proportion N:P:     2.47:1.0.

Part of the compound is mixed with 1 percent of tungsten trioxide and another part with 2 percent of said trioxide.

Burn tests carried out according to the provisions of ASTM-D 635-63 with the thermoplastic polyamide into which the above-described compound and its mixtures with tungsten trioxide are incorporated showed in all test samples "non-burning" with the following lengths of burning (mean values):

(1) Without the addition of tungsten trioxide 16.4 mm.
(2) With the addition of 1% of tungsten trioxide 6.3 mm.
(3) With the addition of 2% of tungsten trioxide 10.4 mm.
(4) With the addition of 5 % of $SnO_2$     < 25.4 mm.
(5) With the addition of 2% of $ZrO_2$     > 25.4 mm. but < 76 mm.

EXAMPLE 2

The procedure is the same as described in Example 1 whereby, however, the reaction temperature is 330° C.

Analysis after decomposition:
57.8% of phosphorus pentoxide.
28.4% of total nitrogen.
Molar proportion N:P:     2.49:1.0.

EXAMPLE 3

Urea and phosphorus pentoxide are mixed in the molar proportion of 3.0:1.0. Otherwise the procedure is the same as described in Example 1.

Analysis after decomposition:
65.3% of phosphorus pentoxide.
15.14% of total nitrogen.
Molar proportion N:P:     2.35:1.0.

EXAMPLE 4

Urea and phosphorus pentoxide are mixed in the molar proportion of 2.5:1.0. The mixture is reacted at a reaction temperature of 360° C. for one and one quarter hour.

Analysis after decomposition:
69.95% of phosphorus pentoxide.
17.5 % of total nitrogen.
Molar proportion N:P:     2.54:1.0.

EXAMPLE 5

The procedure is the same as described in Example 1 whereby, however, the molar proportion of urea to phosphorus pentoxide is 2.0:1.0. A final product with the following analytical values is obtained:

75.80% of phosphorus pentoxide.
15.85 of total nitrogen.
Molar proportion N:P:   2.12:1.0.

EXAMPLE 6

Thiourea and phosphorus pentoxide are intimately mixed in a molar proportion of 4.0:1.0. The mixture is further processed according to Example 1. Because the temperature of the furnace is 340° C., the operation is carried out in a nitrogen atmosphere in order to prevent intermediate formation of spontaneously inflammable compounds at said temperature. After a reaction period of 1 hour, a reaction product with a content of 57.6% of phosphorus pentoxide and
26.5% of total nitrogen is obtained.
Molar proportion of N:P:   2.34:1.0.

The following examples illustrate the manner in which the resulting reaction products of urea or thiourea with phosphorus pentoxide according to the present invention are incorporated into thermoplastic materials in order to render them flameproof. But the invention is not limited thereto.

EXAMPLE 7

Granular polyamide-6 of a mean molecular weight of 18,000 corresponding to a K-value of 72, with varying glass fiber content is mixed in a rotating vessel with varying amounts of the finely pulverized reaction product obtained by heating urea and phosphorus pentoxide in the molar proportion of 4.0:1.0 for 2 hours. The analysis of said reaction product is as follows:

54.3% of phosphorus pentoxide,
26.5% of nitrogen.

The resulting mixtures are plasticized in a double screw extruder (Type ZDSK of the firm Werner & Pfleiderer of Stuttgart, West Germany) at a temperature of 230°–240° C. for 10 minutes and are then extruded in the form of continuous strands. The strands are passed through a water bath for cooling, chopped to granular cylindrical particles, and dried.

To test its behavior on burning, test specimens of 12.5 cm. length, 1 to 7 cm. width, and 0.63 cm. thickness (according to the specifications of ASTM D 635-63) are produced by injection molding. The specimens are provided in their entire length with markings, are clamped at their one end, and are exposed at their free end to the flame of a standard Bunsen burner of 1 cm. diameter and a height of the flame of 2.5 cm. for 30 seconds. Thereafter the Bunsen burner is removed. The period of time during which the test specimens burn and the length of burning of the test specimens is measured after the flame of the Bunsen burner has been removed. Testing said test specimens for their behavior on burning yields the values given in Table I. Table II illustrates the behavior on burning of the same test specimens which were flameproofed by means of known flameproofing agents. Otherwise they are prepared and tested in the same manner as the test specimens made according to the present invention.

TABLE I

| Test No. | Polyamide-6 % | Glass fiber % | Phosphorus pentoxide urea reaction product % | Length of burning in mm. | Burning time in seconds | Classification according to ASTM | Color |
|---|---|---|---|---|---|---|---|
| 1 | 80 | 10 | 10 | 18 | 90 | non-burning | light |
| 2 | 75 | 15 | 10 | 13 | 80 | do. | do. |
| 3 | 65 | 25 | 10 | 11 | 56 | do. | do. |
| 4 | 55 | 35 | 10 | 9 | 50 | do. | do. |
| 5 | 40 | 50 | 10 | 9 | 40 | do. | do. |
| 6 | 74 | 25 | 1 | 80 | 250 | self-extinguishing | do. |
| 7 | 70 | 25 | 5 | 20 | 70 | non-burning | do. |
| 8 | 60 | 25 | 15 | 7 | 25 | do. | do. |

TABLE II

Comparative tests showing the behavior on burning of glass fiber reinforced Polyamide-6 (mean molecular weight 18,000) with known flameproofing agents

| Test No. | Polyamide-6 % | Glass fiber % | Flameproofing agent % | Burning length in mm. | Burning time in seconds | Classification according to ASTM | Color |
|---|---|---|---|---|---|---|---|
| 9 | 75 | 25 | none | >100 | >300 | burning | light |
| 10 | 65 | 25 | 10% of antimony trioxide | >100 | >300 | burning | light |
| 11 | 65 | 25 | 10% of red phosphorus | 6 | 8 | non-burning | dark |

EXAMPLE 8

In place of the pure polycaprolactum (Polyamide-6) as used in Example 7, there is employed a copolymerization product composed of 70 percent by weight of caprolactum and 30 percent by weight of caprylic acid lactum. Said copolymerization product is mixed and processed according to Example 7 with glass fiber material and the reaction product of urea and phosphorus pentoxide of the molar proportion of 4:1 to yield a molding mixture. Test specimens prepared from said molding mixture as described in Example 8 are tested for their behavior on burning. The resulting values correspond to those given in Table I within the permissible limit of error. Thus these test specimens can also be characterized as "non-burning" according to the specification of ASTM.

The amounts of polyanionic reaction product according to the present invention which is compounded with and incorporated into the thermoplastic material is at least 1 percent and preferably between about 10 percent and about 15 percent.

Other thermoplastics than those mentioned in Examples 1, 7, and 8 can be flameproofed by means of the novel urea-and/or thiourea - phosphorus pentoxide condensation products, such as polymers, copolymers and polycondensation products which have a softening temperature below 300° C., preferably below 250° C. Other suitable polymers are polyolefines such as polyethylene, polypropylene and polybutylene, vinyl aromatic polymers such as polystyrene, and poly-α-methylstyrene as well as polyacrylic acid esters and polymethacrylic acid esters, and the corresponding copolymers with minor amounts of other monomers.

Of particular importance are thermoplastic polycondensation products, such as linear polyesters, and polyamides. Suitable polyesters are, for instance, polyethylene terephthalate and polybutylene terephthalate.

We claim:

1. The process of flameproofing thermoplastics by mixing a thermoplastic material which is selected from the group consisting of a polyamide, a polyolefin, a polystyrene, an acrylic polymer and a thermoplastic linear polyester with a substantially water insoluble polyanionic compound obtained by heating an acid amide compound selected from the group consisting of urea and thiourea with phosphorus pentoxide in a molar proportion between about 1.5:1.0 and about 6.0:1.0 at a temperature between about 250° C. and about 400° C. until ammonia evolution ceases.

2. The process of claim 1, in which the polyanionic compound is a compound obtained by heating the reaction components at a reaction temperature of about 350° C.

3. The process of claim 1, in which the polyanionic compound is a compound obtained by heating the acid amide compound and phosphorus pentoxide in a molar proportion between about 3.0:1.0 and about 4.0:1.0.

4. The process of claim 1, in which the amount of the polyanionic compound compounded with and incorporated in the thermoplastic material is at least 1 percent.

5. The process of claim 1, in which the amount of the polyanionic compound compounded with and incorporated in the thermoplastic material is between about 10 percent and about 15 percent.

6. The process of claim 1, in which the thermoplastic material is a thermoplastic polyamide.

7. Substantially flameproof thermoplastic material having incorporated therein as flameproofing agent a substantially water insoluble polyanionic compound obtained by heating an acid amide compound selected from the group consisting of urea and thiourea with phosphorus pentoxide in a molar proportion between about 1.5:1.0 and about 6.0:1.0 at a temperature between about 250° C. and about 400° C. until ammonia evolution ceases.

8. The substantially flameproof thermoplastic material of claim 7, in which the thermoplastic material is a thermoplastic polyamide.

* * * * *